US012594905B2

(12) United States Patent
Siswick et al.

(10) Patent No.: US 12,594,905 B2
(45) Date of Patent: Apr. 7, 2026

(54) CONTROL SYSTEM AND METHOD

(71) Applicant: JAGUAR LAND ROVER LIMITED, Whitley (GB)

(72) Inventors: Howard Siswick, Coventry (GB); David Waddell, Coventry (GB)

(73) Assignee: Jaguar Land Rover Limited, Whitley (GB)

( * ) Notice: Subject to any disclaimer, the term of this patent is extended or adjusted under 35 U.S.C. 154(b) by 234 days.

(21) Appl. No.: 18/275,854

(22) PCT Filed: Feb. 3, 2022

(86) PCT No.: PCT/EP2022/052624
§ 371 (c)(1),
(2) Date: Aug. 4, 2023

(87) PCT Pub. No.: WO2022/167544
PCT Pub. Date: Aug. 11, 2022

(65) Prior Publication Data
US 2024/0092314 A1     Mar. 21, 2024

(30) Foreign Application Priority Data

Feb. 5, 2021     (GB) ...................................... 2101642

(51) Int. Cl.
*B60R 25/24*          (2013.01)
*G07C 9/00*          (2020.01)

(52) U.S. Cl.
CPC ........ *B60R 25/245* (2013.01); *G07C 9/00309* (2013.01); *G07C 2209/63* (2013.01)

(58) Field of Classification Search
None
See application file for complete search history.

(56) References Cited

U.S. PATENT DOCUMENTS 7,915,998 B2 *   3/2011   Matsubara ......... G07C 9/00309
                                                            340/5.1
2010/0073153 A1     3/2010   Yamaguchi et al.
                              (Continued)

FOREIGN PATENT DOCUMENTS

FR          3011790 A1     4/2015

OTHER PUBLICATIONS

International Search Report and Written Opinion for Application No. PCT/EP2022/052624, dated Apr. 20, 2022, 14 pages.
(Continued)

*Primary Examiner* — Carlos Garcia
(74) *Attorney, Agent, or Firm* — Troutman Pepper Locke, LLP; Dustin B. Weeks; Nicholas H. Doss

(57) ABSTRACT

The present disclosure relates to a control system (1) having one or more controller (21) for controlling a lock mechanism (2-*n*) associated with an aperture closure member (7-*n*) of a vehicle (3). The control system (1) is configured to communicate with two or more portable devices (4-*n*). The control system (1) identifies a change in the operating state of an aperture closure member (7-*n*), and communicates with the two or more portable devices (4-*n*) to determine a location of the two or more portable devices (4-*n*) in dependence on identification of the change in the operating state of the aperture closure member (7-*n*). The control system (1) classifies a first one of the two or more portable devices (4-*n*) located within a target zone (TZ-*n*) as a confirmed portable device (4-*n*); and tracks the location of the confirmed portable device (4-*n*). The control system (1) outputs a control signal (CS-n) for locking the lock mechanism (2-*n*) in dependence on a determination that the location of the confirmed portable device (4-*n*) changes from a location inside the target zone (TZ-n) to a location outside the target zone (TZ-n). The present disclosure also relates to
(Continued)

a vehicle (3) incorporating the control system (1); and a method of controlling a lock mechanism (2-*n*) associated with an aperture closure member (7-n).

16 Claims, 6 Drawing Sheets

(56) References Cited

U.S. PATENT DOCUMENTS

2018/0013834 A1   1/2018  Khan et al.
2019/0295348 A1   9/2019  Kim et al.

OTHER PUBLICATIONS

Combined Search and Examination Report for Application No. GB2101642.3, dated Nov. 5, 2021, 11 pages.

* cited by examiner

CONTROL SYSTEM AND METHOD

TECHNICAL FIELD

The present disclosure relates to a control system and method. More particularly, but not exclusively, the present disclosure relates to a control system and method for controlling a lock mechanism associated with an aperture closure member of a vehicle.

BACKGROUND

A vehicle, such as an automobile, typically has a plurality of aperture closure members associated with respective apertures provided in a body of the vehicle. The aperture closure members may, for example, be in the form of a door or a tailgate. To facilitate operation of the vehicle, it is known to provide a central locking system to provide centralised locking and unlocking of the lock mechanisms associated with each aperture closure member. The central locking system may operate in dependence on a control signal comprising a lock or unlock request. The control signal may be transmitted in dependence of a user input, such as operating an electronic key; or in dependence on performance of a predefined action, such as manual locking or unlocking of one of the vehicle doors.

It is also known to provide a walk away locking (WAL) function operable automatically to lock the lock mechanisms as a user walks away from the vehicle. Known walk away locking systems may have certain operational limitations. For example, the vehicle may be locked while ingress to or egress from the vehicle is still required.

It is against this backdrop that the present invention has been conceived. At least in certain embodiments, the control system according to the present invention may provide improved control of a lock mechanism in a vehicle.

SUMMARY OF THE INVENTION

Aspects of the present invention relate to a control system, a vehicle, a method and a non-transitory computer-readable medium as claimed 25 in the appended claims.

According to a further aspect of the present invention there is provided a control system comprising one or more controller for controlling a lock mechanism associated with an aperture closure member of a vehicle; the control system configured to:

communicate with two or more portable devices;

identify a change in the operating state of an aperture closure member, and communicate with the two or more portable devices to determine a location of the two or more portable devices in dependence on identification of the change in the operating state of the aperture closure member;

classify a first one of the two or more portable devices located within a target zone as a confirmed portable device;

track the location of the confirmed portable device; and output a control signal for locking the lock mechanism in dependence on a determination that the location of the confirmed portable device changes from a location inside the target zone to a location outside the target zone. The change in the operating state may comprise the opening or closing of the aperture closure member. The change in the operating state of the aperture closure member may serve as a prompt to check the location of the portable devices. The or each confirmed portable device is a portable device which is confirmed as being suitable for activating the walk away locking function. The control system may control the or each lock mechanism in dependence on a determined location of the confirmed portable device. The control system may classify or re-classify the or each portable device in dependence on a change in location of the portable device. At least in certain embodiments, the control system may provide a walk away locking function. In use, the control system may automatically lock the or each lock mechanism, for example as a person walks away from the vehicle.

The target zone may be a predefined region. The target zone may comprise or consist of a region external to the vehicle. The target zone may, for example, comprise a region outside an aperture formed in a body of the vehicle for occupant ingress and egress. The target zone may have a predefined outer perimeter. The control system may no longer track the or each confirmed portable device which is displaced away from the vehicle beyond the perimeter. The or each confirmed portable device may be classified as no longer being found or identifiable when displaced beyond the perimeter. The control signal may be output in dependence on a determination that the or each portable device moves away from the vehicle to a location outside of the target zone.

The control system is configured to initiate the walk away locking function in dependence on identification of the change in the operating state of the aperture closure member. Once initiated, the control system seeks to identify one or more portable devices disposed within the target zone and/or within the vehicle. The controller classifies the or each portable device within the target zone as the confirmed portable device. A list of the confirmed portable devices may be generated. The controller may subsequently track the location of each confirmed portable device. When the or each of the confirmed portable devices is taken outside the target zone, the controller may be configured to generate and output the control signal for locking the lock mechanism.

A portable device which is located inside the vehicle, for example in a cabin, may qualify to activate the walk away locking function. Any such portable device identified by the controller is referred to herein as a qualifying portable device. If the location of the portable device changes from a location inside the target zone to a location inside the vehicle, the controller may re-classify the confirmed portable device as a qualifying portable device.

The portable device is configured to function as an electronic key for controlling vehicle access. The portable device may, for example, comprise a key fob. Alternatively, the portable device may comprise a cellular telephone configured to provide an electronic key function. It will be understood that the control system is operable with different types of portable devices, for example a combination of a key fob and a cellular telephone.

The control system may classify each of the two or more portable devices as confirmed portable devices in dependence on a determination that the location of each portable device is within the target zone. The control system may be configured to output the control signal if the confirmed portable device changes from a location inside the target zone to a location outside the target zone The one or more controller may comprise at least one electronic processor having an electrical input for receiving a sensor signal; and at least one memory device electrically coupled to the at least one electronic processor and having instructions stored therein. The sensor signal may identify a change in the operating state of an aperture closure member. The sensor signal may, for example, be received from a closure member position sensor associated with the aperture closure member. The at least one electronic processor may be configured to access the at least one memory device and execute the instructions therein so as to control the lock mechanism. The at least one electronic processor may have at least one output for outputting the control signal.

The one or more controller may be configured to classify a second one of the two or more portable devices located inside the vehicle as a qualifying portable device. The one or more controller may track the location of the or each qualifying portable device. The control system may thereby identify and track one or more portable device located inside the vehicle. At least in certain embodiments, the need to switch the portable device disposed in the vehicle into a sleep mode may be avoided. The one or more controller may be configured to inhibit output of the control signal for locking the lock mechanism in dependence on the identification of one or more of the qualifying portable device. The walk away locking function may be inhibited if one of the qualifying portable device is identified.

The one or more controller may be configured to re-classify the qualifying portable device as a confirmed portable device in dependence on a determination that the location of the qualifying portable device changes from a location inside the vehicle to a location within the target zone. The location inside the vehicle may, for example, indicate that the portable device is inside a cabin of the vehicle.

The one or more controller may be configured to disregard the or each qualifying portable device upon expiry of a predetermined first time period after identification of the change in operating state of the aperture closure member. The one or more controller may track the location of the or each confirmed portable device for a predetermined first time period after identification of the change in operating state of the aperture closure member.

The one or more controller may be configured to re-classify the or each confirmed portable device as a qualifying portable device in dependence on a determination that the location of the confirmed portable device changes from a location within the target zone to a location inside the vehicle.

The one or more controller may be configured to output the control signal to the lock mechanism in dependence on a determination that, within a predetermined second time period after classifying a first one of the two or more portable devices as a confirmed portable device, one or more of the confirmed portable devices are no longer located in the target zone.

The control signal may actuate the lock mechanism to lock the aperture closure member. The control signal may be output to a plurality of lock mechanisms. Alternatively, the control signal may be output to the aperture closure member identified as having a change in state.

The aperture closure member may, for example, be a door for cabin access. Alternatively, or in addition, the aperture closure member may be a tailgate for load space access.

The control system has been described with particular reference to communicating with two or more portable devices. At least in certain embodiments, the control system may operate in relation to one or more of the portable devices. The control system may communicate with the one or more portable devices to determine a location of one or more portable devices in dependence on identification of the change in the operating state of the aperture closure member.

The control system may classify the one or more portable device located within a target zone as a confirmed portable device. The control system may track the location of the confirmed portable device. The control system may output a control signal for locking the lock mechanism in dependence on a determination that the location of the confirmed portable device changes from a location inside the target zone to a location outside the target zone.

According to a further aspect of the present invention there is provided a vehicle comprising a control system as described herein.

According to a further aspect of the present invention there is provided a method of controlling a lock mechanism associated with an aperture closure member of a vehicle; the method comprising:

identifying a change in the operating state of an aperture closure member, and determining a location of two or more portable devices in dependence on identification of the change in the operating state of the aperture closure member;

classifying a first one of the two or more portable devices located within a target zone as a confirmed portable device;

tracking the location of the confirmed portable device; and locking the lock mechanism in dependence on a determination that the location of the confirmed portable device changes from a location inside the target zone to a location outside the target zone. The location of the or each portable device may change. The method may comprise classifying or re-classifying the or each qualifying portable device in dependence on such location changes.

The target zone may be a predefined region. The target zone may comprise or consist of a region external to the vehicle. The target zone may, for example, comprise a region outside an aperture formed in a body of the vehicle for occupant ingress and egress.

The method may comprise classifying a second one of the two or more portable devices located inside the vehicle as a qualifying portable device. The location of the qualifying portable device may be tracked. The method may comprise re-classifying the qualifying portable device as a confirmed portable device in dependence on a determination that the location of the qualifying portable device changes from a location inside the vehicle to a location within the target zone.

The method may comprise re-classifying the or each qualifying portable device as a confirmed portable device in dependence on a determination that the location of the qualifying portable device changes. The location may change from a location inside the vehicle to a location within the target zone.

The method may comprise re-classifying the or each confirmed portable device as a qualifying portable device in dependence on a determination that the location of the confirmed portable device changes from a location within the target zone to a location inside the vehicle.

The method may comprise disregarding the or each qualifying portable device upon expiry of a predetermined first time period after identification of the change in operating state of the aperture closure member.

The method may comprise re-classifying the or each confirmed portable device as a qualifying portable device in dependence on a determination that the location of the qualifying portable device changes within a predetermined first time period.

The method may comprise locking the lock mechanism in dependence on a determination that, within a predetermined second time period after classifying a first one of the two or more portable devices as a confirmed portable device, one or more of the confirmed portable devices are no longer located in the target zone. At least in certain embodiments, the one or more confirmed portable devices may be located outside the vehicle and the target zone.

A plurality of the portable devices may be classified as confirmed portable devices. The method may comprise tracking the location of each of the confirmed portable devices. The method may comprise locking the lock mechanism in dependence on a determination that all of the confirmed portable devices are located outside the target zone.

According to a further aspect of the present invention there is provided a non-transitory computer-readable medium having a set of instructions stored therein which, when executed, cause a processor to perform the method described herein.

The control system has been described herein with reference to two or more portable devices. It will be understood that the control system may also be used in conjunction with a single portable device. The locking and unlocking of the lock mechanisms may be controlled in dependence on a location of the single portable device.

According to a further aspect of the present invention there is provided a control system comprising one or more controller for controlling a lock mechanism associated with an aperture closure member of a vehicle; the control system configured to:

communicate with at least one portable device;

identify a change in the operating state of an aperture closure member, and communicate with the at least one portable device to determine a location of the or each portable device. The control system may be configured to classify a portable device located within the vehicle as being in a first state. The control system may be configured to classify a portable device located within a target zone as being in a second state. The target zone may be a predefined region external to the vehicle. The control system may track the location of the or each portable device classified as being in the first state and/or the second state. The control system may optionally output a control signal for locking the lock mechanism in dependence on a determination that the location of the portable device in the second state changes from a location inside the target zone to a location outside the target zone. The location outside the target zone is disposed outside the vehicle. The control signal may be output in dependence on a determination that the or each portable device moves away from the vehicle and is displaced out of the target zone. The control system may optionally output a control signal for locking the lock mechanism in dependence on a determination that the or each portable device in the second state is not located inside the vehicle and is not located inside the target zone.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

A control system 1 for controlling a lock mechanism 2-$n$ in accordance with an embodiment of the present invention will now be described with reference to the accompanying figures.

Figure 1:
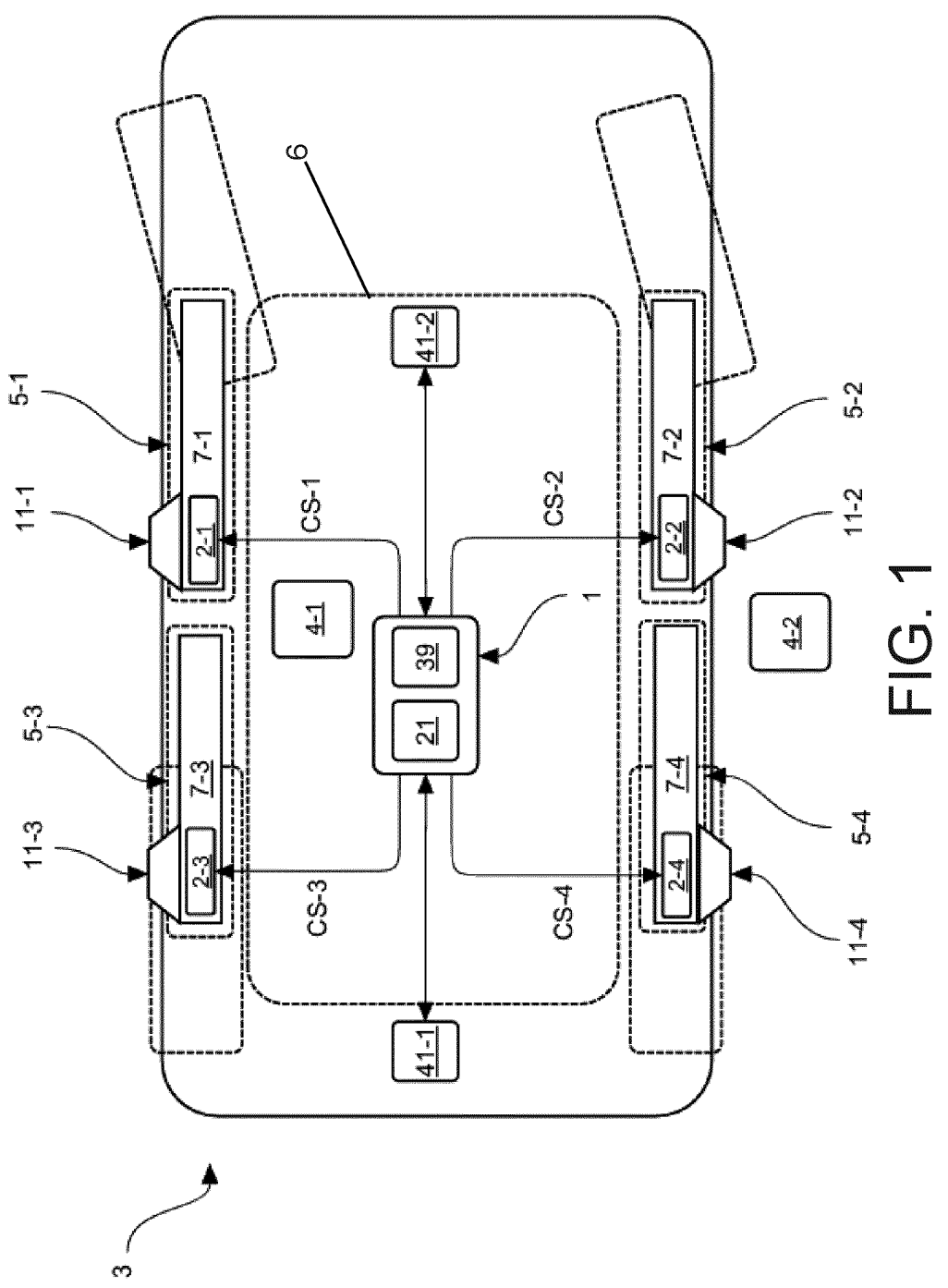
FIG. 1 shows a schematic representation of a vehicle comprising a control system for implementing a walk away locking function in accordance with an embodiment of the present invention.

As shown in FIG. 1, the control system 1 is implemented in a vehicle 3 selectively to control actuation of a plurality of the lock mechanisms 2-$n$. The control system 1 in the present embodiment is configured to control the lock mechanism(s) 2-$n$ automatically. In particular, the control system 1 is configured to lock each of the lock mechanisms 2-$n$ in dependence on a determination that the or each occupant has exited the vehicle 3 and, optionally, moved away from the vehicle 3. The lock mechanisms 2-$n$ can be actuated automatically in dependence on this determination. This operating function is referred to herein as a walk away locking function. As described herein, the control system 1 is configured to identify one or more portable device 4-*n*. Each portable device 4-*n* is associated with the vehicle 3 and is operative as an electronic key. The portable devices 4-*n* in the present embodiment are in the form of key fobs which are typically carried by an occupant(s) of the vehicle 3. The location of the or each portable device 4-*n* is used as an indicator of a location of the or each occupant relative to the vehicle 3. By way of example, FIG. 1 illustrates a first portable device 4-1 in a location inside the vehicle 3; a second portable device 4-2 in a location proximal to an exterior of the vehicle 3; and a third portable device 4-3 in a location distal from an exterior of the vehicle 3. The control system 1 controls operation of the lock mechanisms 2-*n* in dependence on the determined location of the one or more portable device 4-*n* relative to the vehicle 3.

As shown in FIG. 1, the vehicle 3 comprises a plurality of apertures 5-*n* for ingress into and egress from an occupant cabin 6 provided in the vehicle 3. A closure member 7-*n* is associated with each of the apertures 5-*n*. The apertures 5-*n* in the present embodiment are in the form of door openings; and the closure members 7-*n* are in the form of doors. The vehicle 3 has a front left first door 7-1, a front right second door 7-2, a rear left third door 7-3 and a rear right fourth door 7-4. The closure members 7-*n* are movably mounted to a vehicle body 8, for example by hinge mechanisms. The closure members 7-*n* can be opened and closed independently of each other.

Figure 2:
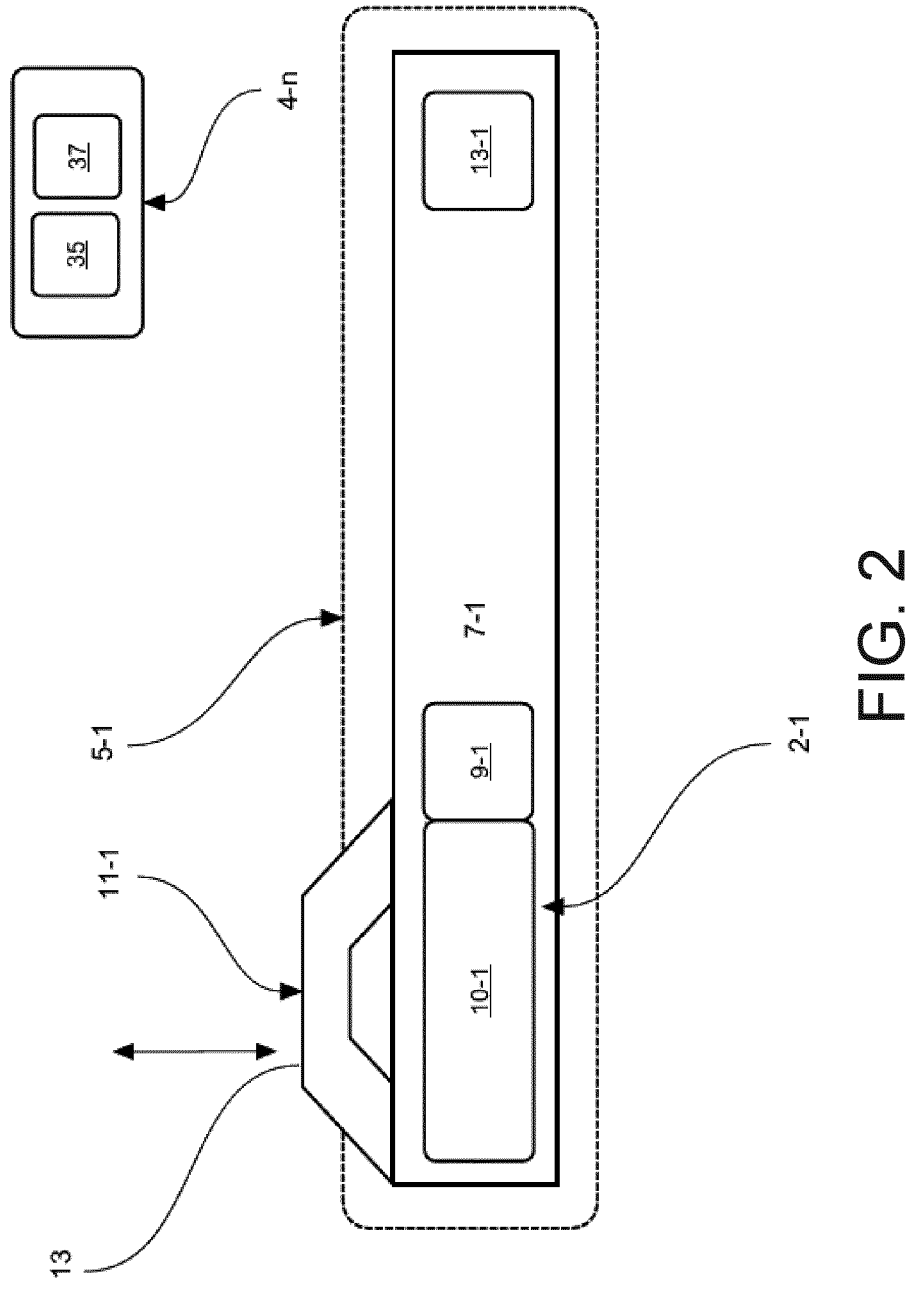
FIG. 2 shows a schematic representation of an aperture closure member incorporating a lock mechanism for actuation in dependence on a control signal output by the control system shown in FIG. 1.

As shown in FIG. 2, a latch mechanism 9-*n* is associated with each of the closure members 7-*n*. The latch mechanisms 9-*n* are operable to secure respective closure members 7-*n*. Each latch mechanism 9-*n* may, for example, comprise a latch member (not shown) for releasably engaging a door latch pin (not shown). The lock mechanisms 2-*n* can be controlled remotely, for example to provide a central locking function. The lock mechanisms 2-*n* each comprise an actuator 10-*n* for selectively locking and unlocking the associated lock mechanism 2-*n*. The actuator 10-*n* may, for example, comprise an electromagnet or an electromechanical actuator. The vehicle 3 comprises a plurality of handles 11-*n* operable to actuate the latch mechanisms 9-*n*. The handles 11-*n* are each associated with a respective one of the latch mechanisms 9-*n*. The handles 11-*n* are manually operated in a conventional manner to release the associated lock mechanism 2-*n*, thereby enabling opening of the closure member 7-*n*. The handles 11-*n* may, for example, undergo a pivoting motion to actuate the lock mechanism 2-*n*.

A closure member position sensor 13-*n* is associated with each closure member 7-*n*. The closure member position sensor 13-*n* is operable to determine an operating state of the associated closure member 7-*n*. For example, the closure member position sensor 13-*n* may determine if the associated closure member 7-*n* is in an open state or a closed state. The closure member position sensor 13-*n* can be used to identify a change in the operating state of the associated closure member 7-*n*, for example to identify when the closure member 7-*n* is opened or closed. The closure member position sensor 13-*n* may be incorporated into the latch mechanism 9-*n*. Alternatively, the closure member position sensor 13-*n* may be separate from the latch mechanism 9-*n*. For example, the closure member position sensor 13-*n* may be mounted to the vehicle body. The closure member position sensor 13-*n* outputs a sensor signal S-n.

The latch mechanism 9-*n* engages the door latch pin when the closure member 7-*n* is closed. The lock mechanism 2-*n* described herein may be configured selectively to lock the latch mechanisms 9-*n* to inhibit opening of the associated closure members 7-*n*. Alternatively, the or each lock mechanism 2-*n* may be configured selectively to connect each handle 11-*n* to the associated latch mechanism 9-*n*. The lock mechanism 2-*n* is "locked" by disconnecting the handle 11-*n* from the latch mechanism 9-*n*, such that operating the handle 11-*n* does not disengage the latch mechanism 9-*n* and the closure member 7-*n* cannot be opened. The lock mechanism 2-*n* is "unlocked" by connecting the handle 11-*n* to the associated latch mechanism 9-*n*, thereby enabling the handle 11-*n* to be operated to disengage the latch mechanism 9-*n* and the closure member 7-*n* to be opened. The lock mechanism 2-*n* is operative selectively to connect the handle 11-*n* on an exterior of the closure member 7-*n* and any corresponding handle on an interior of the closure member 7-*n*. In a further variant, the latch mechanism 9-*n* is electrically actuated. The latch mechanism 9-*n* may, for example, comprise an electromagnet or an electromechanical actuator for selectively actuating the latch mechanism 9-*n*. The latch mechanism 9-*n* may be disengaged in dependence on an open request signal generated in dependence on actuation of the handle 11-*n*. The operation of the latch mechanism 9-*n* is controlled in dependence on a lock signal or an unlock signal. This arrangement may be implemented in door closure member or a tailgate. For example, a tailgate latch mechanism 2-*n* may be controlled in dependence on a release request signal output when a tailgate control switch is operated. The release request signal may be processed or ignored based on a current locking state of the tailgate. In these types of electronically controlled mechanisms, the lock mechanism 2-*n* is incorporated into the latch mechanism 9-*n* and the associated latch controller.

Figure 3:
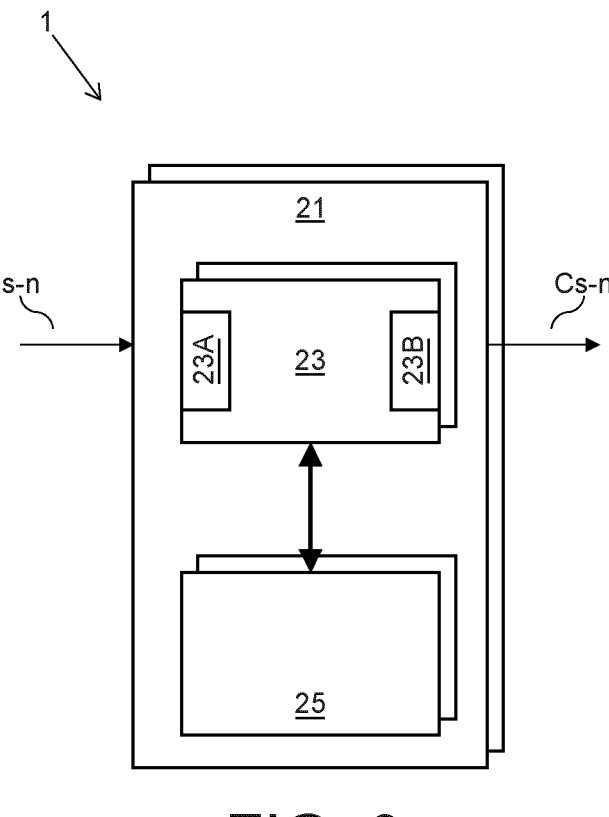
FIG. 3 shows a schematic representation of the control system shown in FIG. 1.

As shown in FIG. 3, the control system 1 comprises a controller 21 for controlling operation of the lock mechanisms 2-*n*. The controller 21 is operative selectively to lock and unlock the lock mechanisms 2-*n*. The controller 21 comprises at least one electronic processor 23 and a system memory 25. A set of computational instructions is stored on the system memory 25. When executed the instructions cause the at least one electronic processor 23 to perform the method(s) described herein. The at least one electronic processor 23 has an electrical input 23A for receiving the sensor signal S-n from the closure member position sensor 13-*n*; and at least one electrical output 23B for outputting one or more control signal CS-n to control the lock mechanisms 2-*n*. The control signal CS-n selectively opens and closes the lock mechanisms 2-*n*. The control signal CS-n may comprise a lock request signal or an unlock request signal for controlling one or more of the lock mechanisms 2-*n*. In the present embodiment, the walk away locking function comprises automatically locking all of the lock mechanisms 2-*n*. As described herein, the controller 21 identifies predefined operating conditions for implementing the walk away locking function. If these operating conditions are satisfied, the control signal CS-n output by the controller 21 comprises a WAL request. Each lock mechanism 2-*n* is re-configured or maintained in a locked state in dependence on receipt of the WAL request. The WAL request may cause each lock mechanism 2-*n* to change from an unlocked state to a locked state; or may cause each lock mechanism 2-*n* to remain in a locked state. In a variant, the walk away locking function comprises automatically locking a subs-set of the lock mechanisms 2-*n*, for example the lock mechanism(s) 2-*n* associated with an aperture closure member 7-*n* identified as having a change in state.

The controller 21 is configured to control operation of the or each lock mechanism 2-*n* in dependence on a determined location of the one or more portable device 4-*n*. In the present embodiment, the controller 21 is configured to determine the location of a plurality of the portable devices 4-*n*. The portable devices 4-*n* each function as an electronic key for controlling locking and/or unlocking of the closure members 7-*n*. Each of the portable devices 4-*n* is an authorised device at least insofar as there is a pre-existing association with the vehicle 3 (or a pre-established digital connection with the vehicle 3). For example, the portable device 4-*n* may be electronically paired with the vehicle 3. An authentication process may be performed to authorise the portable device 4, for example comprising sharing unique identification codes (numerical or alphanumeric) between the portable device 4-*n* and the vehicle 3. The portable devices 4-*n* in the present embodiment are in the form of dedicated electronic keys, for example in the form of key fobs or the like. In a variant, the portable device 4-*n* may be a general-purpose computational device, such as a cellular telephone. The cellular telephone may function as an electronic key, for example by confirming user identify. The portable device 4-*n* may be configured to execute a software application for communicating with the vehicle 3, for example to identify the portable device 4-*n* and to establish communication with the controller 21. The portable devices 4-*n* each comprise a device controller 35 and a device transceiver 37 for transmitting and receiving a wireless (RF) signal. The device transceiver 37 in the present embodiment is an ultra-wideband transceiver. In a variant, the vehicle transceiver 37 may be Low Frequency (LF) transceiver or an Ultra High Frequency (UHF) transceiver. The device controller 35 comprises a processor (not shown) and a memory system (not shown).

The control system 1 comprises a transceiver 39 (referred to herein as a base transceiver) for communicating with the portable devices 4-*n*. The base transceiver 39 is a radio frequency (RF) transceiver for transmitting and receiving wireless signals. The base transceiver 39 is connected to one or more antenna 41 disposed on the vehicle 3. In the present embodiment, the base transceiver 39 is connected to first and second antennas 41-1, 41-2 disposed in discrete locations spaced apart from each other. The control system 1 transmits a polling signal to detect portable devices 4-*n* proximal to the vehicle 3, for example within a predetermined range of the vehicle 3. The (or each) portable device 4-*n* receiving the polling signal transmits a response signal comprising identification means, such as a unique identification code. The control system 1 may thereby perform an electronic handshake with each detected portable device 4-*n*.

The controller 21 processes the identification code to determine if the portable device 4-*n* is authorised for operation with the vehicle 3. An authorised device may, for example, be authorised selectively to lock and unlock the lock mechanism 2-*n*. The controller 21 stores the identification code of each portable device 4-*n* authorised to operate in conjunction with the vehicle 3. The identification code is stored in the system memory 25, for example in a database or a look-up table. The controller 21 classifies a portable device 4-*n* as an unauthorised device if the identification code in the response signal received from the portable device 4-*n* is not present in the database. If the identification code is not recognised, the controller 21 classifies the portable device 4-*n* as an unauthorised device. No further communication is performed between the controller 21 and an unauthorised one of the portable devices 4-*n*. The controller 21 classifies a portable device 4-*n* as an authorised device if the identification code in the response signal received in the portable device 4-*n* is present in the database. If the identification code is recognised, the controller 21 classifies the portable device 4-*n* as an authorised device. The controller 21 implements the walk away locking function in dependence on the determined location of the or each authorised portable device 4-*n*. The walk away locking function of the controller 21 will now be described in more detail.

In certain embodiments, the device transceiver 29 and/or the base transceiver 39 may comprise a low energy system suitable for local (short-range) communications, for example to a establish a wireless personal area network. The low energy system may be configured to establish an initial connection between the control system 1 and the portable device 4-*n*. A suitable low energy system is Bluetooth® Low Energy. The device transceiver 29 may be a dedicated device for communicating with the or each portable device 4-*n*. Alternatively, the device transceiver 29 may perform other functions, such as determining with which satellite (SAT) to communicate.

The walk away locking function is initiated when a change in state is identified in one or more of the aperture closure member 7-*n*. The change in state may comprise or consist of opening and/or closing of the aperture closure member 7-*n*. An initiation timer is started when the change in state of the aperture closure member 7-*n* is identified. The initiation timer may reduce or avoid depletion of a battery (not shown) in the portable device 4-*n*, for example if the walk away locking function is delayed or does not take place promptly following the change in state of the aperture closure member 7-*n*. The controller 21 is configured to implement the walk away locking function upon expiry of a predetermined first time period following identification of the change in state of the aperture closure member 7-*n*.

The controller 21 is configured to determine a geospatial location of the or each authorised portable device 4-*n* relative to the vehicle 3. The controller 21 may, for example, measure a time-of-flight of signals transmitted to and/or received from the or each portable device 4-*n*. Alternatively, or in addition, signal strength may be used to estimate the distance between the vehicle 3 and the portable device 4-*n*. The controller 21 may determine at least a distance (range) between the vehicle 3 and the or each portable device 4-*n*. The controller 21 may optionally determine a heading (direction) of the portable device 4-*n* in relation to the vehicle 3. For example, a trilateration (or true-range multilateration) algorithm may be implemented for the time-of-flight of signals transmitted to or received from the portable device 4-*n* by the respective antennas 41-*n*.

The controller 21 monitors the location of the or each portable device 4-*n*. The controller 21 is configured to differentiate between a location of the portable device 4-*n* inside the vehicle 3 and a location outside the vehicle 3. The controller 21 may determine a range (distance) to the portable device 4-*n* from a fixed vehicle reference point to differentiate between a location inside the vehicle 3 and a location outside the vehicle 3. The controller 21 may determine that the portable device 4-*n* is inside the vehicle 3 when the determined range is less than a predefined threshold; and that the portable device 4-*n* is outside the vehicle 3 when the determined range is greater than a predefined threshold.

Figure 4:
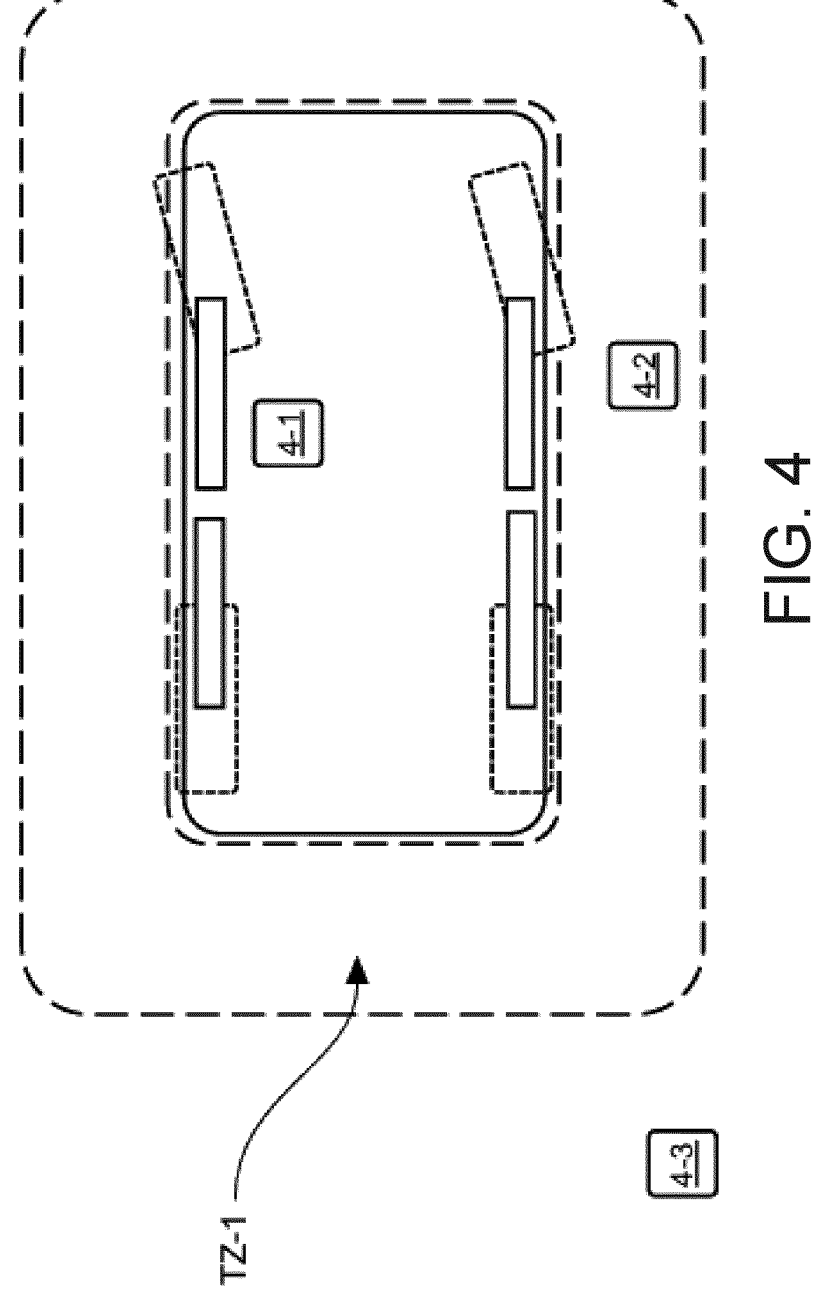
FIG. 4 shows a schematic representation of a target zone defined relative to the vehicle.
Figure 5:
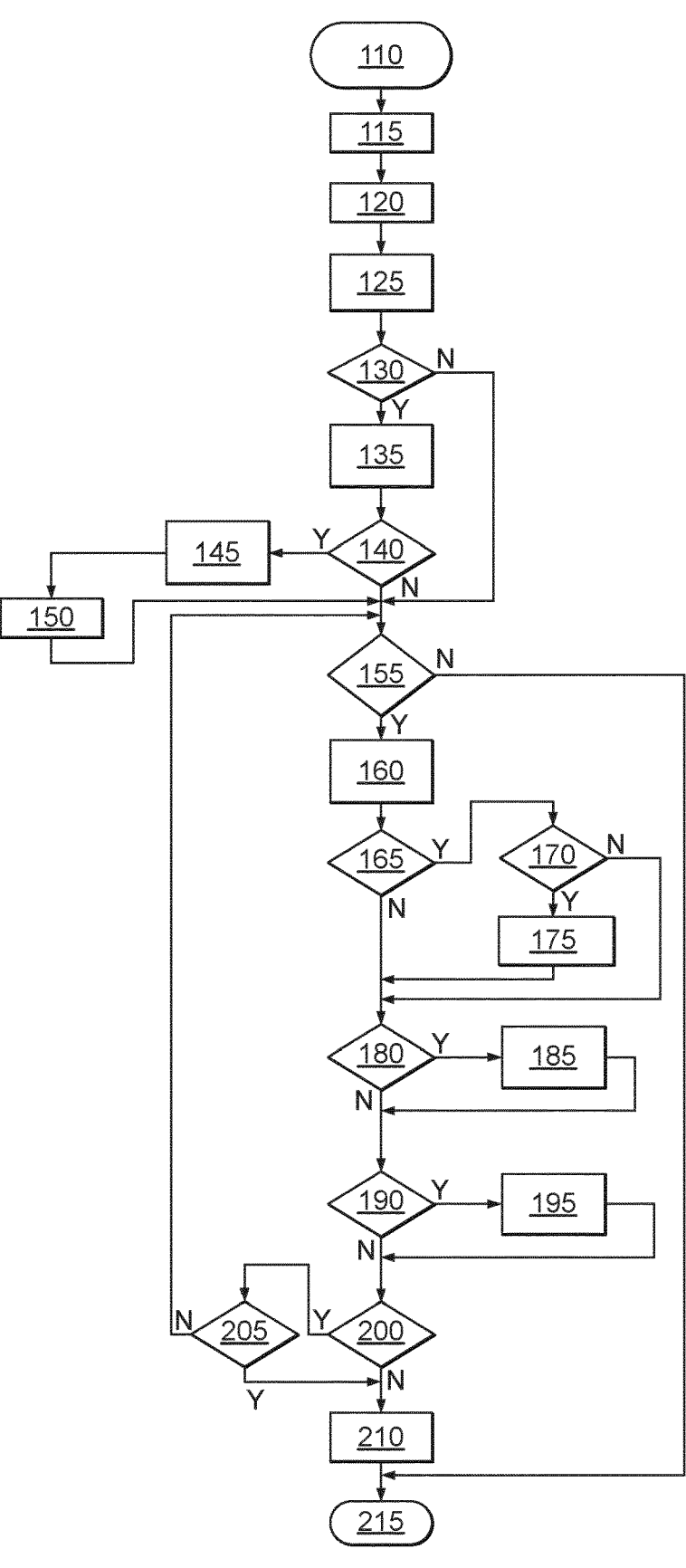
FIG. 5 shows a block diagram illustrating operation of the control system in accordance with an embodiment of the present invention.
Figure 6:
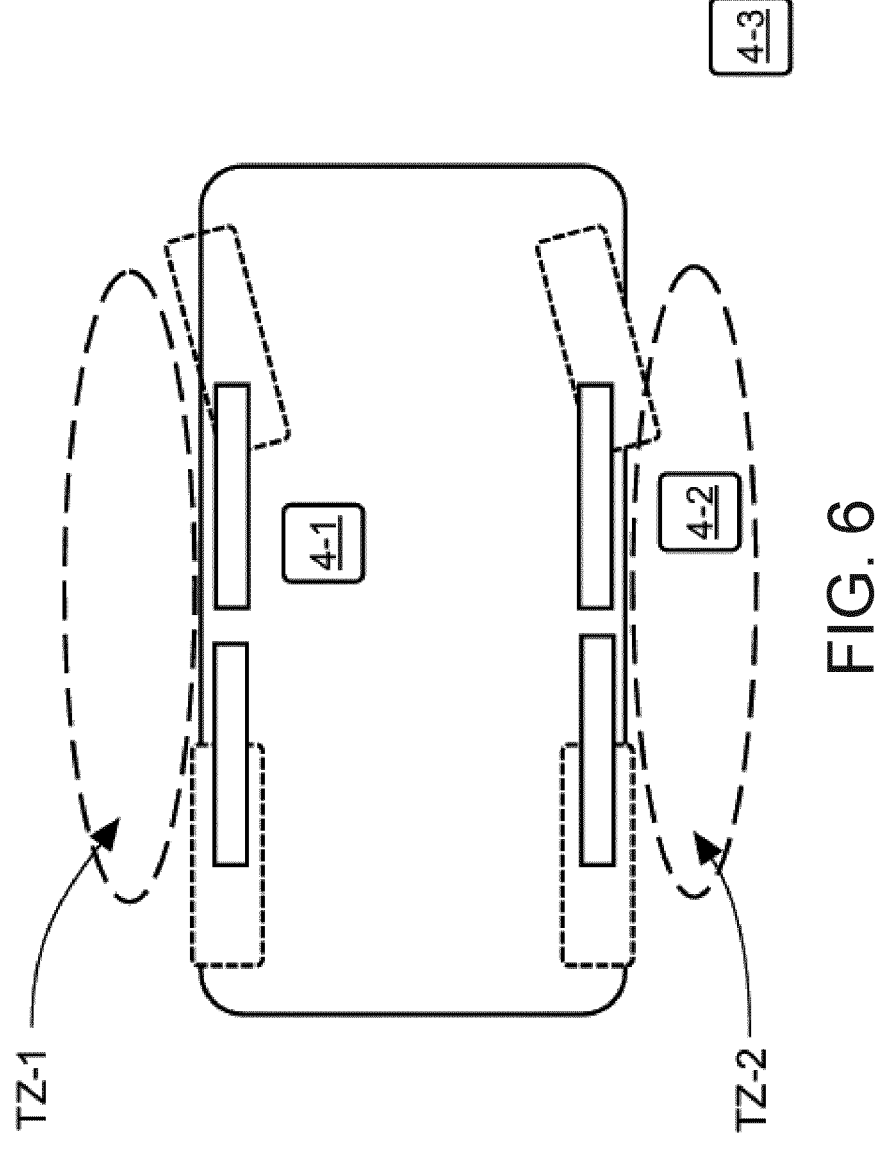
FIG. 6 shows a schematic representation of a modified target zone defined relative to the vehicle.

The controller 21 is configured to track the location of the or each portable device 4-*n* after identifying the change in the state of the aperture closure member 7-*n*. The walk away locking function is implemented in dependence on identification of a change in location of the or each portable device 4-$n$ relative to the vehicle 3. A target zone TZ1 is a virtual region defined external to the vehicle 3, as shown schematically in FIG. 4. The controller 21 implements the walk away locking function in dependence on the location of the or each portable device 4-$n$ relative to the target zone TZ1. The target zone TZ1 is distinct from the interior of the vehicle 3. The target zone TZ1 extends outwardly from an exterior of the vehicle 3. The target zone TZ1 comprises a region immediately outside each of the apertures 5-$n$. The target zone TZ1 has an outer perimeter or boundary which is a predetermined distance from the exterior of the vehicle 3. As shown in FIG. 4, the target zone TZ1 in the present embodiment is centred on the vehicle 3 and has a generally rectangular profile (in plan form). It will be understood that the target zone TZ1 may have different profiles. For example, the target zone TZ1 may have a polygonal profile or an elliptical profile. The target zone TZ1 may comprise two or more discrete regions. The target zone TZ1 may, for example, comprise first and second regions disposed on opposing sides of the vehicle 3. A variant is shown in FIG. 6 comprising first and second target zones TZ1, TZ2 defined on respective first and second sides of the vehicle 3. The control system 1 may define two or more target zones TZ1, for example each discrete target zone TZ1 corresponding to each aperture closure member 7-$n$.

At the time that the walk away locking function is triggered (for example in dependence on a change of state of closure member 7-$n$), the controller 21 is configured to classify the or each authorised portable device 4-$n$ as being in one of two operating states. When the walk away locking function is triggered, a portable device 4-$n$ identified as being located inside the vehicle 3 is designated as being in a first state for implementation of the walk away locking function. The first state indicates that the portable device 4-$n$ qualifies to implement the walk away locking function. A portable device 4-$n$ identified as being in the first state is referred to herein as being a "QUALIFIED" portable device. The controller 21 monitors the location of the or each portable device 4-$n$ in the first state. The controller 21 may be configured to inhibit or to prevent the walk away locking function while one or more portable device 4-$n$ remain in the first state. When the walk away locking function is triggered, a portable device 4-$n$ identified as being within the target zone TZ1 (and outside the vehicle 3) is designated as being in a second state for implementation of the walk away locking function. The second state indicates that the portable device 4-$n$ is confirmed to implement the walk away locking function. A portable device 4-$n$ identified as being in the second state is referred to herein as being a "CONFIRMED" portable device. The controller 21 monitors the location of the or each portable device 4-$n$ in the second state. The controller 21 re-classifies the or each portable device 4-$n$ from the first state to the second state if the portable device 4-$n$ is moved from inside the vehicle 3 into the target zone TZ1 within a predetermined time period following initiation of the walk away locking function. Conversely, the controller 21 re-classifies the or each portable device 4-$n$ from the second state to the first state if the portable device 4-$n$ is moved from inside the target zone TZ1 to inside the vehicle 3.

The classification of each of the portable devices 4-$n$ in dependence on their location relative to the vehicle 3 will now be described with reference to FIG. 4. The first portable device 4-1 is disposed inside the vehicle 3 (inside the cabin 6) and is classified as being in the first state qualified to implement the walk away locking function. The second portable device 4-2 is disposed outside the vehicle 3 within the target zone TZ1 and is classified as being in the second state confirmed to implement the walk away locking function. The third portable device 4-3 is disposed outside the target zone TZ1 when the walk away locking function is triggered. The third portable device 4-3 is no longer identified by the control system 21 and may be classified as being not found. If the third portable device 4-3 was outside an operating range of the vehicle 3 at the time of the walk away lock process being triggered, the third portable device 4-3 is not classified in either of the first and second states described herein. The third portable device 4-3 does not influence the walk away locking function.

The controller 21 is configured to output the control signal CS-$n$ comprising the WAL request in dependence on a determination that, after expiry of a first time period since activation of the lock timer, all of the portable devices 4-$n$ classified as being in the second state can be identified. Alternatively, the controller 21 outputs the control signal CS-$n$ comprising the WAL request in dependence on a determination that the previously identified confirmed portable devices 4-$n$ are not present in either the vehicle 3 or the target zone TZ1. The controller 21 may optionally be configured to inhibit the walk away locking function if there remain one or more portable device 4-$n$ classified as being in the first state. Alternatively, the controller 21 may implement the walk away locking function only in respect of the or each aperture closure member 7-$n$ identified as having a change in state. Thus, only the or each aperture closure member 7-$n$ having an identified change of state will be locked in dependence on the WAL request. In the present embodiment, the controller 21 starts an initiation timer when the process starts. The controller 21 is configured to disregard any portable devices 4-$n$ disposed in the vehicle 3 upon expiry of a second time period since activation of the initiation timer. The second time period is predetermined and is less than the first time period in the present embodiment.

The operation of the controller 21 to implement the walk away locking function will now be described with reference to a first block diagram 100 shown in FIG. 6. The controller 21 is activated in dependence on a notification from one of the closure member position sensors 13-$n$ indicating that the associated aperture closure member 7-$n$ has been opened or closed (BLOCK 110). The controller 21 initiates the walk away locking function in dependence on detection of a change in state of one or more of the aperture closure member 7-$n$ (BLOCK 115). The initiation timer is initiated for the walk away locking function (BLOCK 120). The controller 21 initiates a scan for portable devices 4-$n$ (BLOCK 125). The scan is performed to identify portable devices 4-$n$ both inside and outside the vehicle 3. A first check is performed to determine if one or more identified portable device 4-$n$ is disposed inside the vehicle 3 (BLOCK 130). The or each portable device 4-$n$ identified inside the vehicle 3 is deemed to be a qualifying device and is classified as being in the first state (i.e. a qualified device) (BLOCK 135). A check is performed to identify a portable device 4-$n$ disposed outside one of the apertures 5-$n$ (BLOCK 140). The or each portable device 4-$n$ disposed outside the vehicle 3 and proximal to one of the aperture 5-$n$ is deemed to be a confirmed device and is classified as being in the second state (BLOCK 145). A lock timer is started following classification of the or each portable device 4-$n$ in the second state (BLOCK 150). If there are no portable devices 4-$n$ identified inside the vehicle 3 (BLOCK 130) and no portable devices 4-$n$ disposed outside the vehicle 3 and proximal to one of the apertures 5-$n$ (BLOCK 140), a check is performed to determine if any portable devices 4-*n* were classified as being in the first state or the second state (BLOCK 155). The controller 21 performs another scan for portable devices 4-*n* inside and outside the vehicle 3 (BLOCK 160). A second check is performed to determine if any of the portable device 4-*n* are inside the vehicle 3 (BLOCK 165). The controller 21 checks if a portable device 4-*n* identified inside the vehicle 3 was previously classified in the second state (BLOCK 170). The controller 21 re-classifies (demotes) the portable device 4-*n* from the second state to the first state (BLOCK 175). The controller 21 checks if the first time period since the initiation timer was started (BLOCK 120) has expired (BLOCK 180). If the first time period has expired, the controller 21 removes all portable devices 4-*n* identified as being in the first state (BLOCK 185). A check is performed to determine if there are any portable devices 4-*n* classified as being in the first state which are now outside the vehicle 3 (BLOCK 190). The or each portable device 4-*n* identified as being in the first state and now outside the vehicle 3 is re-classified from the first state to the second state (BLOCK 195). This further check may optionally comprise an additional scanning function. A check is performed to determine if one or more of the portable devices 4-*n* classified as being in the second state (i.e. a confirmed device) has been identified (BLOCK 200). If one or more of the portable devices 4-*n* classified in the second stated is found, the controller 21 checks if the second time period since the lock timer was started (BLOCK 150) has expired (BLOCK 205). If the second time period has expired, the controller 21 outputs the control signal CS-n comprising the WAL request (BLOCK 210). If the controller 21 is unable to find one or more of the portable devices 4-*n* currently classified as being in the second state (BLOCK 200), the controller 21 determines that the portable device 4-*n* (or those portable devices 4-*n*) have been displaced away from the vehicle 3. The controller 21 then outputs the control signal CS-n comprising the WAL request (BLOCK 210). The control signal CS-n requests that each lock mechanism 2-*n* is locked (either actuated to the locked state or maintained in the locked state). The walk away locking function ends after issuing the control signal CS-n comprising the WAL request (BLOCK 215). If the controller 21 does not identify one or more portable devices 4-*n* in the first state or the second state (BLOCK 155), the controller 21 bypasses outputting the control signal CS-n and the walk away locking function is cancelled (BLOCK 215). When the initiation timer expires, the controller 21 cancels the walk away locking function if no portable device 4-*n* classified as being in the second state are identified even if one or more portable device 4-*n* classified as being in the first state is identified.

It will be appreciated that various modifications may be made to the embodiment(s) described herein without departing from the scope of the appended claims.

The controller 21 may differentiate between the portable device 4-*n* being located inside the vehicle 3 and being located outside the vehicle 3 with reference to an interior target zone and an exterior target zone. The controller 21 may determine that the portable device 4-*n* is inside the vehicle 3 when the determined location is coincident with the internal target zone. The controller 21 may determine that the portable device 4-*n* is outside the vehicle 3 when the determined location is coincident with the exterior target zone.

FIRST BLOCK DIAGRAM LABELS

| | |
|---|---|
| 110 | VEHICLE APERTURE PERMITTED TO BEGIN WALK AWAY LOCKING FUNCTION IS OPENED OR CLOSED |
| 115 | WALK AWAY LOCKING PROCESS STARTED |
| 120 | START WALK AWAY LOCKING INITIATION TIMER |
| 125 | SCAN FOR PORTABLE DEVICES IN AND AROUND VEHICLE |
| 130 | ANY PORTABLE DEVICES FOUND INSIDE THE VEHICLE |
| 135 | DESIGNATE ALL PORTABLE DEVICES INSIDE VEHICLE AS 'QUALIFIED' |
| 140 | ANY PORTABLE DEVICES FOUND OUTSIDE APERTURE |
| 145 | DESIGNATE ALL PORTABLE DEVICES IMMEDIATELY OUTSIDE APERTURE AS 'CONFIRMED' |
| 150 | START LOCK TIMER |
| 155 | ANY QUALIFIED OR CONFIRMED PORTABLE DEVICES |
| 160 | RE-SCAN FOR PORTABLE DEVICES IN AND AROUND VEHICLE |
| 165 | ANY PORTABLE DEVICES FOUND INSIDE VEHICLE |
| 170 | WERE ANY DEVICES PREVIOUSLY CONFRIMED |
| 175 | DEMOTE THOSE PORTABLE DEVICE PREVIOUSLY CONFIRMED TO QUALIFIED |
| 180 | INITIATION TIME EXPIRED |
| 185 | REMOVE ALL PORTABLE DEVICES FROM THE QUALIFIED LIST |
| 190 | ANY QUALIFIED PORTABLE DEVICES NOW OUTSIDE THE VEHICLE |
| 195 | ADD THESE PORTABLE DEVICES TO CONFIRMED LIST |
| 200 | ARE ALL CONFIRMED KEYS FOUND |
| 205 | HAS LOCK TIMER EXPIRED |
| 210 | ISSUE WALK AWAY LOCKING REQUEST |
| 215 | END OF WALK AWAY LOCKING PROCESS |

The invention claimed is:

1. A control system comprising one or more controller for controlling a lock mechanism associated with an aperture closure member of a vehicle; the control system configured to:

communicate with two or more portable devices;

identify a change in the operating state of an aperture closure member, and communicate with the two or more portable devices to determine a location of the two or more portable devices dependent on identification of the change in the operating state of the aperture closure member;

classify a first one of the two or more portable devices located within a target zone as a confirmed portable device;

classify a second one of the two or more portable devices located inside the vehicle as a qualifying portable device track the location of the confirmed portable device and the qualifying portable device; and output a control signal for locking the lock mechanism dependent on a determination that the location of the confirmed portable device changes from a location inside the target zone to a location outside the target zone.

2. A control system as claimed in claim 1 wherein the one or more controller is configured to re-classify the confirmed portable device as a qualifying portable device dependent on a determination that the location of the confirmed portable device changes from a location within the target zone to a location inside the vehicle.

3. A control system as claimed in claim 1, wherein the one or more controller is configured to output the control signal to the lock mechanism dependent on a determination that, within a predetermined second time period after classifying a first one of the two or more portable devices as a confirmed portable device, one or more of the confirmed portable devices are no longer located in the target zone.

4. A vehicle comprising the control system as claimed in claim 1.

5. A control system as claimed in claim 1 wherein the one or more controller is further configured to re-classify the qualifying portable device as a confirmed portable device dependent on a determination that the location of the qualifying portable device changes from a location inside the vehicle to a location within the target zone.

6. A control system as claimed in claim 1, wherein the one or more controller comprises:

at least one electronic processor having an electrical input for receiving a sensor signal; and at least one memory device electrically coupled to the at least one electronic processor and having instructions stored therein, and wherein the at least one electronic processor is configured to access the at least one memory device and execute the instructions therein so as to control the lock mechanism.

7. A control system as claimed in claim 6 wherein the at least one electronic processor has at least one output for outputting the control signal.

8. A control system as claimed in claim 1, wherein the one or more controller is configured to disregard the qualifying portable device upon expiry of a predetermined first time period after identification of the change in operating state of the aperture closure member.

9. A control system as claimed in claim 8, wherein the one or more controller is configured to re-classify the confirmed portable device as a qualifying portable device dependent on a determination that the location of the qualifying portable device changes within the first time period.

10. A method of controlling a lock mechanism associated with an aperture closure member of a vehicle; the method comprising:

identifying a change in the operating state of an aperture closure member, and determining a location of two or more portable devices dependent on identification of the change in the operating state of the aperture closure member;

classifying a first one of the two or more portable devices located within a target zone as a confirmed portable device;

classifying a second one of the two or more portable devices located inside the vehicle as a qualifying portable device;

tracking the location of the confirmed portable device and the qualifying portable device; and locking the lock mechanism dependent on a determination that the location of the confirmed portable device changes from a location inside the target zone to a location outside the target zone.

11. A method as claimed in claim 10 comprising re-classifying the confirmed portable device as a qualifying portable device dependent on a determination that the location of the confirmed portable device changes from a location within the target zone to a location inside the vehicle.

12. A method as claimed in claim 10 comprising locking the lock mechanism dependent on a determination that, within a predetermined second time period after classifying a first one of the two or more portable devices as a confirmed portable device, one or more of the confirmed portable devices are no longer located in the target zone.

13. A method as claimed in claim 10 comprising re-classifying the qualifying portable device as a confirmed portable device dependent on a determination that the location of the qualifying portable device changes from a location inside the vehicle to a location within the target zone.

14. A method as claimed in claim 10 comprising disregarding the qualifying portable device upon expiry of a predetermined first time period after identification of the change in operating state of the aperture closure member.

15. A method as claimed in claim 14 comprising reclassifying the confirmed portable device as a qualifying portable device dependent on a determination that the location of the qualifying portable device changes within the first time period.

16. A control system comprising one or more controller for controlling a lock mechanism associated with an aperture closure member of a vehicle; the control system configured to:

communicate with two or more portable devices;

identify a change in the operating state of an aperture closure member, and communicate with the two or more portable devices to determine a location of the two or more portable devices dependent on identification of the change in the operating state of the aperture closure member;

classify a first one of the two or more portable devices located within a target zone as a confirmed portable device;

classify a second one of the two or more portable devices located inside the vehicle as a qualifying portable device;

track the location of the confirmed portable device and the qualifying portable device;

re-classify the qualifying portable device as another confirmed portable device dependent on a determination that the location of the qualifying portable device changes from a location inside the vehicle to a location within the target zone; and output a control signal for locking the lock mechanism dependent on a determination that the location of the confirmed portable device changes from a location inside the target zone to a location outside the target zone.

* * * * *